Oct. 2, 1928.

E. FRANCIS

AUTOMOBILE TIRE CARRIER

Filed May 21, 1927     2 Sheets-Sheet 1

1,686,231

Inventor
E. Francis

By Lacey & Lacey, Attorneys

Oct. 2, 1928.
E. FRANCIS
1,686,231
AUTOMOBILE TIRE CARRIER
Filed May 21, 1927   2 Sheets-Sheet 2
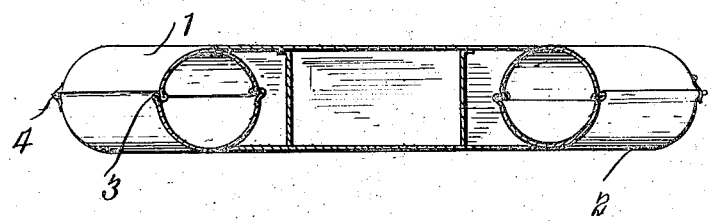
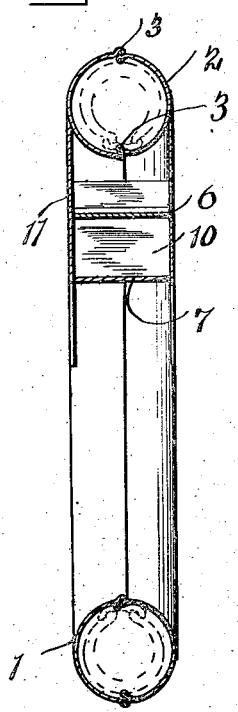
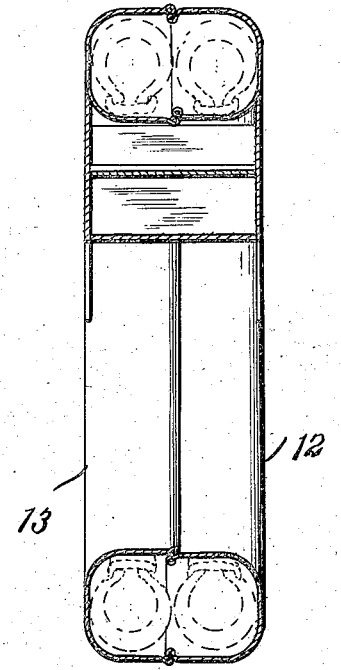
Inventor
E. Francis
By Lacey & Lacey, Attorneys Patented Oct. 2, 1928.

1,686,231

UNITED STATES PATENT OFFICE.

ETHELBERT FRANCIS, OF MOUNDSVILLE, WEST VIRGINIA.

AUTOMOBILE TIRE CARRIER.

Application filed May 21, 1927. Serial No. 193,209.

The present invention is directed to improvements in automobile tire carriers.

The primary object of the invention is to provide a device of this character so constructed that a spare tire may be conveniently carried upon an automobile, the construction being such that tools may be also conveniently contained in the carrier.

Another object of the invention is to provide a device of this kind wherein a space is provided for the printing of advertising matter.

Another object of the invention is to provide a carrier so constructed that it can be securely locked to prevent surreptitious removal of the tires.

With these and other objects in view, this invention resides in novel features of construction, formation, combination and arrangement of parts to be hereinafter more fully described, claimed and illustrated in the accompanying drawings, wherein,—

Figure 3 is a sectional view on line 3—3 of Figure 1.

Figure 4 is a sectional view on line 4—4 of Figure 1.

Figure 5 is a vertical, central sectional view of a modified form of the invention.

Figure 1:
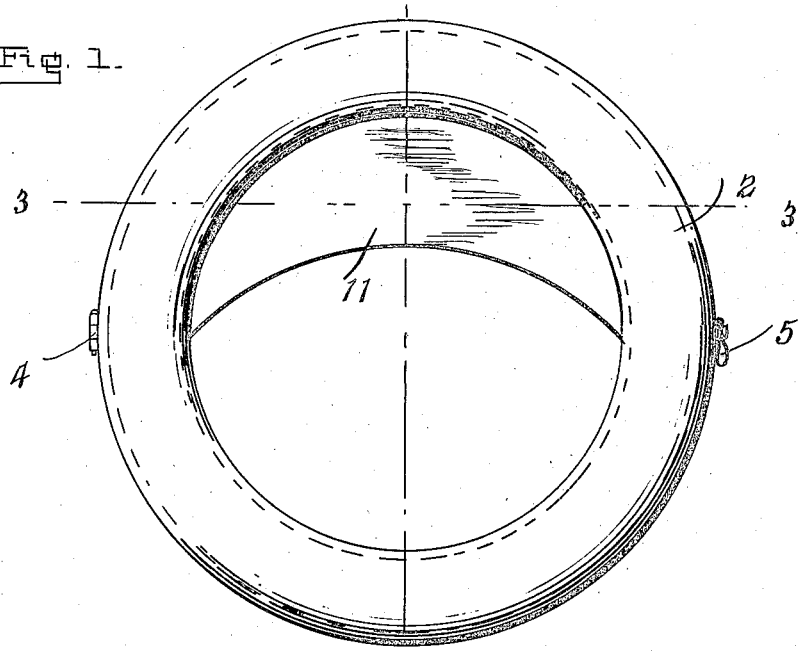
Figure 1 is a rear elevation of the carrier.
Figure 2:
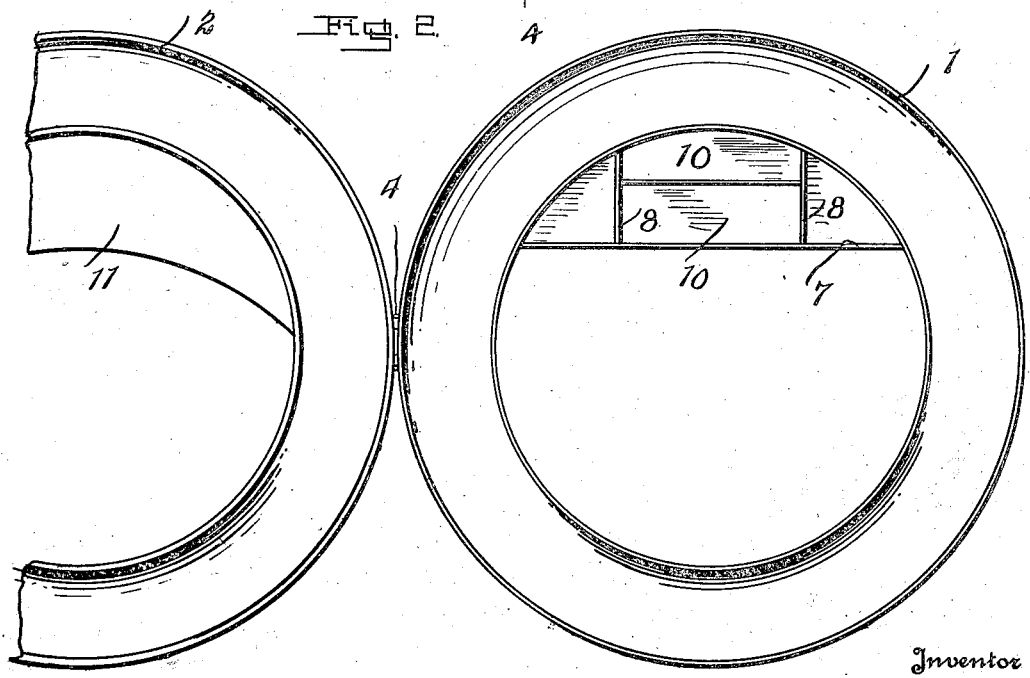
Figure 2 is a similar view showing the other section in its open position.

The carrier consists of inner and outer ring-like sections 1 and 2 formed from suitable sheet metal or any other material, said sections being semi-circular in cross section, in order to conform to the contour of a tire. The edges of the sections are reinforced by wire bands 3.

The section 2 is hingedly connected, as at 4, to one side of the section 1, in order that it can be easily swung to its open or closed position to permit removal or replacement of a tire. The section 1 is of such size that it will enter the companion section to assure a tight joint to prevent entrance of water and dust, as more clearly illustrated in Figures 3 and 4. A lock 5 is provided to firmly hold the sections in locked position.

The inner section 2 carries a plate 6, the lower edge of which is bent forwardly to provide a bottom 7, there being vertical partitions 8 and a horizontal partition 9 to provide compartments 10 in which tools or other articles may be stored. The section 1 carries a plate 11 which closes the open ends of the compartments 10 when the sections are locked, and it is upon the outer surface of this plate 11 that advertising matter may be printed.

It will be obvious that to remove a tire from the carrier that it is only necessary to remove the lock and swing the outer section open, thereby permitting the tire to be easily lifted from the carrier. I have illustrated the sections 1 and 2, as being hingedly connected at their sides, but it will be of course understood that the hinge connection may be placed at the top or bottom of the sections if deemed desirable.

In Figure 5, the inner and outer sections 12 and 13 are somewhat larger than the other forms in order that a pair of spare tires may be placed in the carrier.

Any suitable means may be employed for securing the carrier to the rear of an automobile, or upon one of the running boards thereof.

Having thus described the invention, I claim:

A tire carrier comprising hingedly connected inner and outer ring-like sections, semi-circular in cross section, a plate carried by the inner section having its lower edge bent forwardly to provide a bottom, partitions associated with said plate and bottom and defining compartments within the confines of both sections, the outer section having a plate carried thereby for closing the outer ends of the compartment when the sections are in their closed position.

In testimony whereof I affix my signature.

ETHELBERT FRANCIS. [L. S.]